United States Patent
Kori

[11] Patent Number: 5,883,959
[45] Date of Patent: Mar. 16, 1999

[54] VIDEO COPY PROTECTION

[75] Inventor: Teruhiko Kori, Kanagawa, Japan

[73] Assignee: Sony Corporation, Tokyo, Japan

[21] Appl. No.: 838,886

[22] Filed: Apr. 14, 1997

[30] Foreign Application Priority Data

Apr. 18, 1996 [JP] Japan .................................. 8-120887
May 22, 1996 [JP] Japan .................................. 8-150129

[51] Int. Cl.$^6$ .................................................. H04N 7/167
[52] U.S. Cl. ...................................................... 380/9; 380/5
[58] Field of Search ...................................... 380/5, 9, 12

[56] References Cited

U.S. PATENT DOCUMENTS

| 5,608,799 | 3/1997 | Ryan et al. | 380/11 |
| 5,651,065 | 7/1997 | Stufflet al. | 380/15 |
| 5,661,801 | 8/1997 | Sperber | 380/15 |
| 5,784,523 | 7/1998 | Quan et al. | 380/15 |

FOREIGN PATENT DOCUMENTS 29 24 453 A   1/1981   Germany .

WO 96 36174
A   11/1996   WIPO .

*Primary Examiner*—David Cain
*Attorney, Agent, or Firm*—Frommer Lawrence & Haug LLP; Willaims S. Frommer

[57]  ABSTRACT

Regular burst signals from video line (n+0) to line (n+3) are replaced by modified burst signals which function as copy prohibit signals. The phase of the modified burst signals is controlled by controlling at least one of the orthogonal vectors into which the phase of the regular burst signal is resolved; and the phase vector of the modified burst signals is equal to the average value of the phase vector of the regular burst signals in lines (n+0) through (n+3). The phase vector of the modified burst signal in line (n+2) exhibits a phase difference of 135° from the phase vector of the original regular burst signal in that line and causes image disturbances when the thus-modified video signal is recorded and reproduced by a VCR. The phase vector of the modified burst signal in each of lines (n+0), (n+1) and (n+3) exhibits a difference as small as 45° from the phase vector of the original regular burst signal in those lines.

35 Claims, 19 Drawing Sheets

ANALOG VIDEO SIGNAL

ANALOG VIDEO SIGNAL

ANALOG VIDEO SIGNAL

|          | P       | S        |
|----------|---------|----------|
| SIGNAL-1 | 6 LINES | 34 LINES |
| SIGNAL-2 | 4 LINES | 36 LINES |
| SIGNAL-3 | 2 LINES | 38 LINES |
| SIGNAL-4 | 4 LINES | 30 LINES |
| SIGNAL-5 | 3 LINES | 31 LINES |
| SIGNAL-6 | 2 LINES | 32 LINES |

Fig. 17
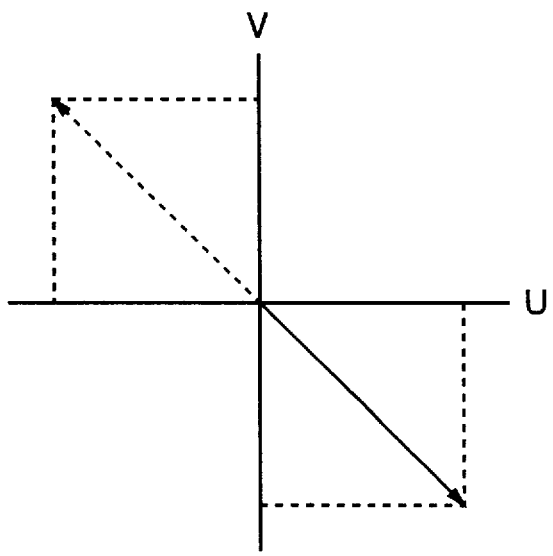
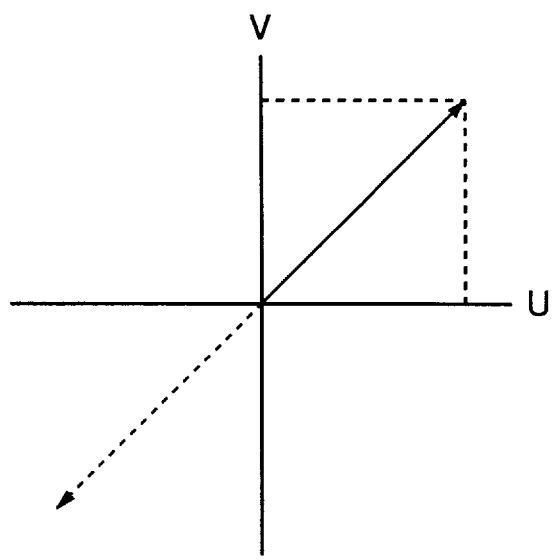

Fig. 18A

| CGMS | | DEFINITION |
|---|---|---|
| 1 | 1 | PROHIBITED COPY |
| 1 | 0 | APPROVE 1st GENERATION COPY |
| 0 | 1 | SPARE |
| 0 | 0 | APPROVE COPY |

Fig. 18B

| FLAG | | DEFINITION |
|---|---|---|
| 0 | 0 | NOT GENERATE ANALOG COPY LIMIT SIGNAL |
| 0 | 1 | GENERATE AGC SIGNAL ALONE |
| 1 | 0 | GENERATE AGC & 2nd COPY PROHIBIT SIGNALS |
| 1 | 1 | GENERATE AGC & 1st COPY PROHIBIT SIGNALS |

Fig. 19

| | MSB | | | | | | | LSB |
|---|---|---|---|---|---|---|---|---|
| PC0 | 0 | 1 | 1 | 0 | 0 | 0 | 0 | 1 |
| PC1 | CGMS | | COPY SOURCE | | COPY GENERATION | | SS | |
| PC2 | RECORD START | 1 | RECORD MODE | | 1 | DISPLAY | | |
| PC3 | FF | FS | FC | IL | ST | SC | BCSYS | |
| PC4 | 1 | GENRE CATEGORY | | | | | | |

Fig. 20

| | MSB | | | | | | | LSB |
|---|---|---|---|---|---|---|---|---|
| PC0 | 0 | 1 | 0 | 1 | 0 | 0 | 0 | 1 |
| PC1 | CGMS | | COPY SOURCE | | COPY GENERATION | | SS | |
| PC2 | RECORD START | RECORD END | RECORD MODE | | 1 | 1 | 1 | 1 |
| PC3 | DRF | SPEED | | | | | | |
| PC4 | 1 | GENRE CATEGORY | | | | | | |

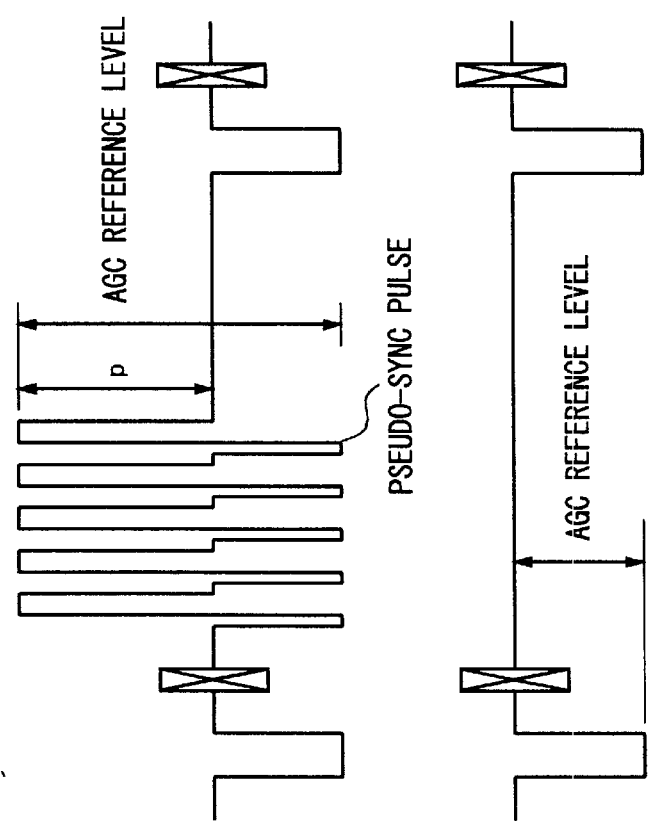
Fig. 21A
Fig. 21B
Fig. 21C

Fig. 24A
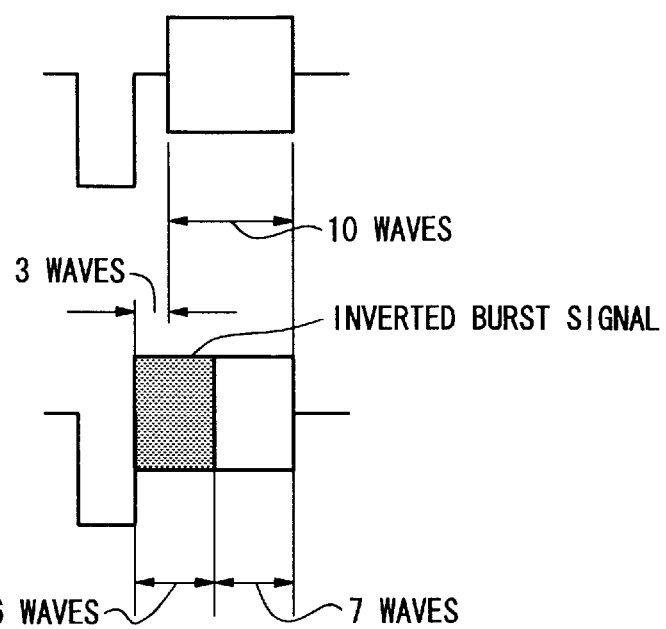
Fig. 24B
Fig. 24C
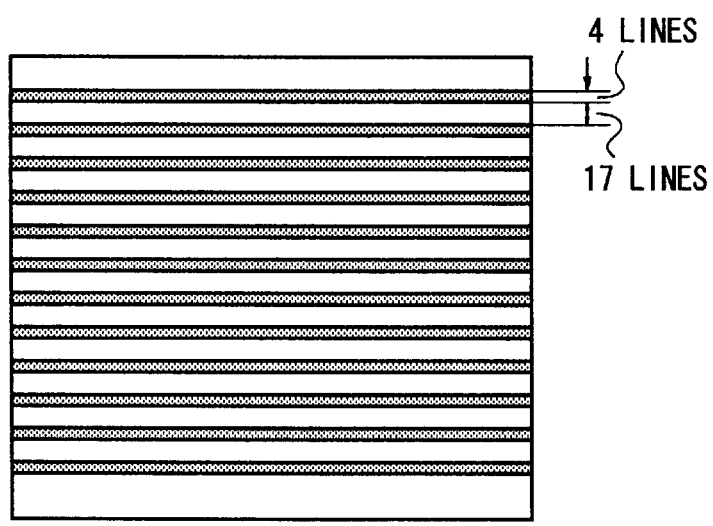
Fig. 25
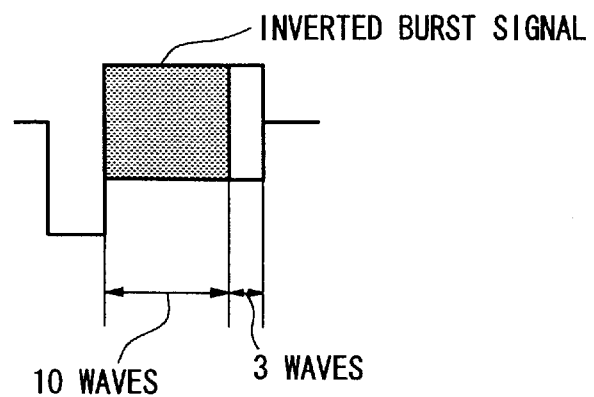

VIDEO COPY PROTECTION

BACKGROUND OF THE INVENTION

This invention relates to copy protection to selectively prohibit the recording (i.e., copying) of analog video signals output from video discs, digital VCRs, digital broadcasting receivers, computers or other digital devices, yet permits satisfactory display by TV receivers of the original copy-protected video signals.

With the development of digital technologies, it has become easier and more commonplace to provide high-quality video signal sources for consumer use. For example, digital broadcasting terminals and DVDs (digital video discs) provide users with high-quality video signals and constitute such high-quality video sources. Digital VCRs (video cassette recorders) are gradually increasing their share of consumer use. Currently, however, analog VCRs are much more popular, and providers of high-quality video sources must take into account the coding or processing of digital video signals so as to restrict or prohibit the copying by analog VCRs of the analog version of digital video signals in order to protect the copyright of such video signals.

There are known techniques for prohibiting copying by analog VCRs known as, for example, the AGC pulse system and the color stripe system. The AGC pulse system restricts or prohibits copying of an analog video signal by inserting pulses having an amplitude larger than the normal AGC reference level typically recognized by the AGC circuits of the analog VCR. That is, pseudo sync pulses are inserted in some of the vertical blanking periods of the video signal, as shown in FIG. 21A. FIG. 21B is an enlarged view of a line interval in the blanking period in which the pseudo sync pulses are inserted. The pseudo sync pulses may comprise five cycles of a pulse of level p added to the horizontal sync pulse. Thus, the usual AGC reference level, measured as the level of the horizontal sync pulse, is increased by p.

Many types of analog VCRs (such as consumer-use analog VCRs) are configured to perform the AGC operation by using the horizontal sync pulse in a 1H line interval in the vertical blanking period, as shown in FIG. 21C. In these VCRs when the pseudo sync pulse having a larger amplitude than the horizontal sync pulse is inserted in the 1H line interval, the AGC circuit executes its AGC operation on the amplitude of the pseudo sync pulse as if the pseudo sync pulse is the reference level. As a result, the gain of the AGC circuit is erroneously thought to be too large and, accordingly, is decreased so as to be too small to detect the sync signal and to normally reproduce the video signal. TV monitors, however, use an AGC system that differs from that of analog VCRs and can adequately display reproduced images notwithstanding the pseudo sync pulses.

However, those video cassette recorders having long AGC time constants, such as β-system VCRs, 8 mm VCRs and some VHS-system VCRs, are not particularly sensitive to pseudo sync pulses. To account for this, the color stripe system has been proposed. In the color stripe system, the phase of the color burst signal in the reproduced video signal is inverted for N-out-of-M lines; for example, 4 out of 21 lines.

TV monitors use APC (automatic phase control) for extracting color burst signals from the video signal (more particularly from the chroma signal). The phase of the color burst signal is detected and phase changes are integrated by a low pass filter, for example, to control a voltage controlled oscillator to generate a reference subcarrier for color demodulation of the input video signal. The reference subcarrier is also used as a reference signal for phase detecting the burst signal.

When a video signal processed by the color stripe system is recorded on another consumer-use analog VCR, the APC circuit of the analog VCR erroneously recognizes the phase-inverted color burst signal as if it is the original color burst signal. This results in inverting the color of the line when that video signal is reproduced. As a result, color-inverted lines appear in the displayed image every 21 lines, as shown in FIG. 22.

On the other hand, typical TV receivers use long time constant APC circuits having a narrow frequency response range for generating the reference subcarrier wave for color signal demodulation, so that the reproduced images are not affected when the color burst signals in only four lines are inverted. However, for those APC circuits that exhibit a long time constant but a wide frequency response range, color-inverted lines may appear in the displayed image.

In view of this, the assignee of the present invention has proposed that for all lines in an effective image display, the phase of only a certain period of the burst signal is inverted. This prevents deterioration of the quality of images even with TV monitors that exhibit color-inverted lines when using the color stripe system.

In consumer-use analog VCRs, the color subcarrier of frequency of 3.58 Mhz (in case of NTSC) is frequency-converted into a low-band-converted color signal having a center frequency in the range of 600 to 700 kHz. The low-band-converted color signal is frequency-multiplexed with a luminance signal and recorded on magnetic tape. When the video signal is reproduced, the low-band-converted color signal is frequency-separated and converted into a color signal having the original carrier frequency. Consequently, because of such recording/reproducing processing and the characteristics of the electromagnetic elements (e.g., tape, heads, etc.), the color signals in consumer-use analog VCRs are limited to a much narrower band than TV receivers. Because of this narrow band of the color signals, the duration of the reproduced color burst signal tends to expand relative to the duration of the original signal prior to recording. FIG. 23A shows the color burst signal in an original signal and FIG. 23B shows the expanded color burst duration in the signal reproduced by the VCR. The original color burst signal a shown in FIG. 23A is expanded to a' as shown in FIG. 23B when recorded on and then reproduced from the magnetic tape.

This inherent characteristic is used in the above-mentioned proposal by the assignee to invert the phase of only a few cycles of the color burst signals to prohibit copying. FIGS. 24A to 24C show an example of this proposal. For normal lines, the color burst signal extends over 10 cycles, for example (FIG. 24A). In some lines, however, in order to induce image disturbance for copy protection, 13 cycles of the color burst signal are provided, including 6 cycles of the phase-inverted color burst signal and 7 cycles of the normal phase color burst signal (FIG. 24B). For example, a block of 21 lines includes 17 lines with regular (i.e., normal phase) color burst signals and four lines with inverted color burst signals, these blocks being repeated throughout the image (FIG. 24C). When this type of copy-protected video signal is reproduced, the APC circuit in the color sync circuit of the VCR cannot follow the burst signal. As a result, the quality of the image displayed from the copied signal is deteriorated, and copying of the signal is prevented. However, TV monitors detect and use the normal phase color burst signals to display substantially normal images from the original, non-copied, copy-protected video signal.

This type of copy protection relies on VCRs that record color signals having narrow frequency bands and is not very effective in S-VHS analog VCRs, for example, in which the color subcarrier extends over a wide band. To overcome this problem, it is suggested to increase the number of cycles of inverted color burst signals in the burst interval. FIG. 25 shows an example in which the 13 cycles of burst signal include 10 cycles of inverted phase and three cycles of regular (i.e., normal) phase. This assures the copy prohibit function even with VCRs that record with wide band color signals. However, depending on the TV monitor, images displayed thereby may be unacceptably deteriorated. For example, even when no phase inversion of the burst signal occurs, images may be distorted by displaying a difference in color saturation resulting in horizontal stripes or by changes in color saturation over the entire image.

The present inventor attempted to overcome this problem of different color saturation by proposing blocks of copy prohibit signals formed of lines containing copy prohibit signals with a larger number of inverted color burst signals alternating with lines containing increased amplitude of regular color burst signals. Here the repetitive frequency of regular-phase color burst signals increases beyond the frequency response range of TV monitor APC circuits, thereby preventing or at least minimizing image disturbances caused by inverted color burst signals. Since normal phase color burst signals of increased amplitude are used, the decrease in cycles of regular color burst signals (caused by an increase in the number of cycles of inverted color burst signals) is compensated, and image disturbances on the TV monitors are prevented. On the other hand, when these copy-protected signals are copied and reproduced by VCRs, image disturbances are generated as a result of the expansion of the inverted color burst signals (FIG. 23B).

As known, TV monitors use an ACC (automatic color correction) circuit for automatic correction of color signal levels or amplitudes. The ACC circuit may use diode detection or phase detection, the output of which is integrated. When the ACC circuit uses phase detection, the above copy-protection method causes a substantial decrease in the color burst signal levels due to a cancellation of the integrated value of the detected inverted color burst signals because the inverted color burst signals are substituted for the regular color burst signals. However, since only some of the cycles of the color burst signals are modified (i.e., phase inverted), they compensate for the decreased level, and cancel the image disturbing function.

When the ACC circuit uses diode detection, phase information does not affect the detector output; for example, inverted color burst signals do not significantly affect the detector output but, rather, the inverted color burst signals result in overcorrection and cause image disturbance. A problem of ACC circuits is that their operating characteristics vary with different TV monitors so that the amount of correction that is needed is not determined definitely. Therefore, when a TV monitor is supplied with a signal containing such copy prohibit signals, it uses a fixed value to effect correction against the disturbance and residual errors may be detected as a disturbance. To overcome this problem, the inventor proposed a method of using inverted color burst signals and regular color burst signals of increased amplitude in a single horizontal line; and permitting the user to modify the amplitudes of the color burst signals as desired. If overcorrection by burst signals of increased amplitude occurs, image disturbance can be removed from TV monitor displays by appropriately setting the amplitude of such color burst signals.

While this method is effective when a video signal is supplied to a single TV monitor, it may be ineffective when the video signal is supplied to two or more monitors. For example, when two or more TV monitors are supplied from a single video output, it is difficult to effect appropriate corrections in all monitors to remove fully the disturbance in the display. This problem also occurs when a single TV monitor has a multi-screen display, such as a main screen and a sub-screen (e.g., picture-in-picture). In this case, since the sub-screen displays an image of the main screen in smaller size, the single monitor has separate circuits for processing the signals for the main screen and the sub-screen; and elements used in the respective circuits often are based on different standards. This may result in different characteristics of the ACC circuits and the APC circuits in the main screen and the sub-screen. Consequently, even after an appropriate setting is made for one, image disturbances may occur when the image displayed on the main screen is switched to the subscreen.

OBJECTS OF THE INVENTION

Therefore, it is an object of the present invention to provide a copy protection technique for a video signal that can alleviate disturbances of images displayed on TV monitors but effectively performs copy prohibit functions.

Another object of the invention is to provide copy protection of an analog video signal by controlling the phase of the burst signal in a number of video lines to cause undesirable color striping in the video picture displayed therefrom.

A further object of the invention is to provide a copy protection technique of the aforementioned type, wherein the average value of the phase vector of the burst signal that has been modified is approximately equal to the average phase vector of those burst signals that had been replaced by the modified burst signals.

Various other objects and advantages of the present invention will become readily apparent from the following disclosure and the appended claims.

SUMMARY OF THE INVENTION

In accordance with this invention, a technique is provided for restricting the recording of an analog video signal. Copy prohibit signals are generated and substituted for color burst signals over a plurality of continuous lines of video signals. The phase of the copy prohibit signals is controlled such that the average value of the phase vectors of the copy prohibit signals in the continuous lines is substantially equal to the average value of the phase vectors of the regular color burst signals that are replaced by the copy prohibit signals.

According to another aspect of the invention, color burst signals different in sequence from the regular color burst signals are added to a plurality of continuous lines of video signals.

According to a further aspect of the invention, a recording medium stores pre-recorded digital video signals including information which instructs the replacement of regular color burst signals in the analog video signals produced therefrom with copy prohibit signals in a plurality of continuous lines, the copy prohibit signals being phase controlled burst signals such that the average value of the phase vectors of the copy prohibit burst signals is substantially equally to the average value of the phase vectors of the regular burst signals in those continuous lines.

As a result of this invention, when a copy-protected video signal containing the copy prohibit burst signals is reproduced by a VCR, color stripe image distortion is produced whereas no image disturbance is present in the image displayed by TV monitors which are supplied with the original (i.e., non-copy) copy-protected video signal. Moreover, no adjustment is required for ACC circuits that may exhibit different characteristics in different TV monitors, for example.

BRIEF DESCRIPTION OF THE DRAWINGS

FIG. 17 is a schematic diagram showing an undesirable example of color burst phase control.

FIG. 18A and 18B are schematic diagrams used for explaining a CGMS and trigger bits of a digital video signal used to instruct the generation of a copy protection signal;

FIG. 19 is a schematic diagram of a data pack in which CGMS is recorded by a digital VCR;

FIG. 20 is a schematic diagram of another data pack in which CGMS is recorded by a digital VCR;

FIGS. 21A to 21C are waveform diagrams useful in explaining an AGC copy protection system;

FIGS. 24A to 24C are schematic diagrams relating to a copy-protection proposal which inverts the phase of the burst signal; and FIG. 25 is a waveform diagram showing another burst phase inversion technique for copy protection of analog video signals.

DETAILED DESCRIPTION OF PREFERRED EMBODIMENTS

Figure 1A:
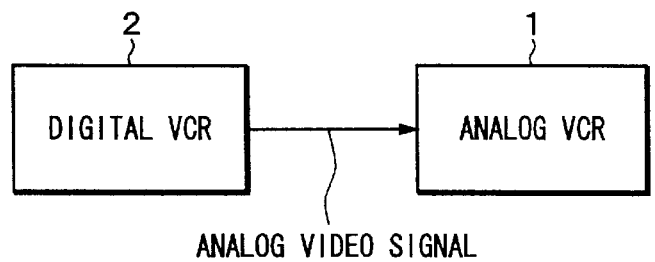
FIGS. 1A to 1C are block diagrams showing examples of video signal recording systems to which the invention is applicable.
Figure 1B:
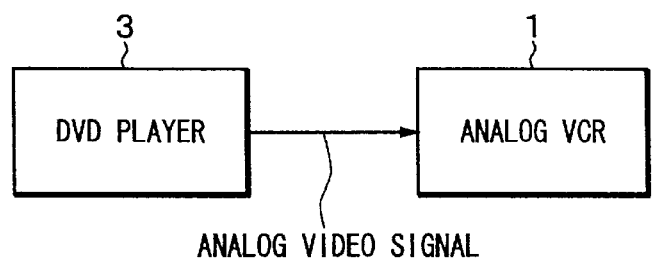
Figure 1C:
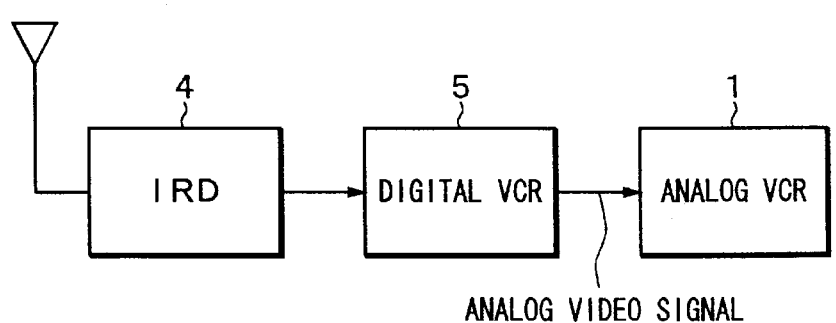

Before describing the preferred embodiments of the invention, an explanation of its application to copy control is made with reference to FIGS. 1A to 1C. FIG. 1A shows an example in which an analog video signal is reproduced from a digital VCR 2 and then is recorded by an analog VCR 1. If a cassette tape reproduced by the digital VCR 2 is a pre-recorded tape bearing control information which limits the number of copies that can be made therefrom (copy generation management system known as CGMS limits the number of generations of copies that can be made), recording by the analog VCR 1 should be prohibited.

FIG. 1B shows an example in which an analog video signal is reproduced from a DVD player 3 and then is recorded by the analog VCR 1. Here again, if CGMS data recorded on the DVD prohibits any copies from being made, recording by the analog VCR 1 should be prohibited. FIG. 1C shows an example in which a program received by an IRD 4 (Integrated Receiver Decoder, such as a set top box), adapted to receive digital broadcasting such as satellite broadcasting, is recorded on a digital VCR 5 and the recorded content then is reproduced in analog form and recorded on the analog VCR 1. In most cases, digital broadcasting programs are available for recording once on digital VCR 5. However, a copy of the recorded program on analog VCR 1 is to be prohibited. It is of course possible that if digital VCR 5 is omitted, an analog copy of the video signals from IRD 4 to analog VCR 1 also should be prohibited.

The present invention is adapted to prohibit analog VCR 1 from copying video signals but permits a monitor device coupled to digital VCR 2, DVD player 3 or digital VCR 5 to display acceptable images from analog video signals that are recovered from the digital devices. This is achieved by placing within a video field a number of lines in which the regular color burst signals are replaced by copy prohibit signals formed of modified color burst signals which are phase controlled as a function of vector resolution (or decomposition) of the phases of the orthogonal phases (U and V) that make up the regular color burst signals. But, such copy prohibit signals do not interfere with the ACC circuits found in most TV monitors. This is particularly suitable for use in PAL or PAL plus systems employed mainly in Europe.

TV monitors, in general, use an ACC circuit for automatic correction of a difference between a luminance signal level and a color signal level. The ACC circuit detects the amplitude of the color burst signal, and controls the gain of the chroma amplifier circuit to keep the color burst signal level constant. As a result, the color depth, or saturation, of the displayed image is automatically adjusted to be constant.

Figure 2:
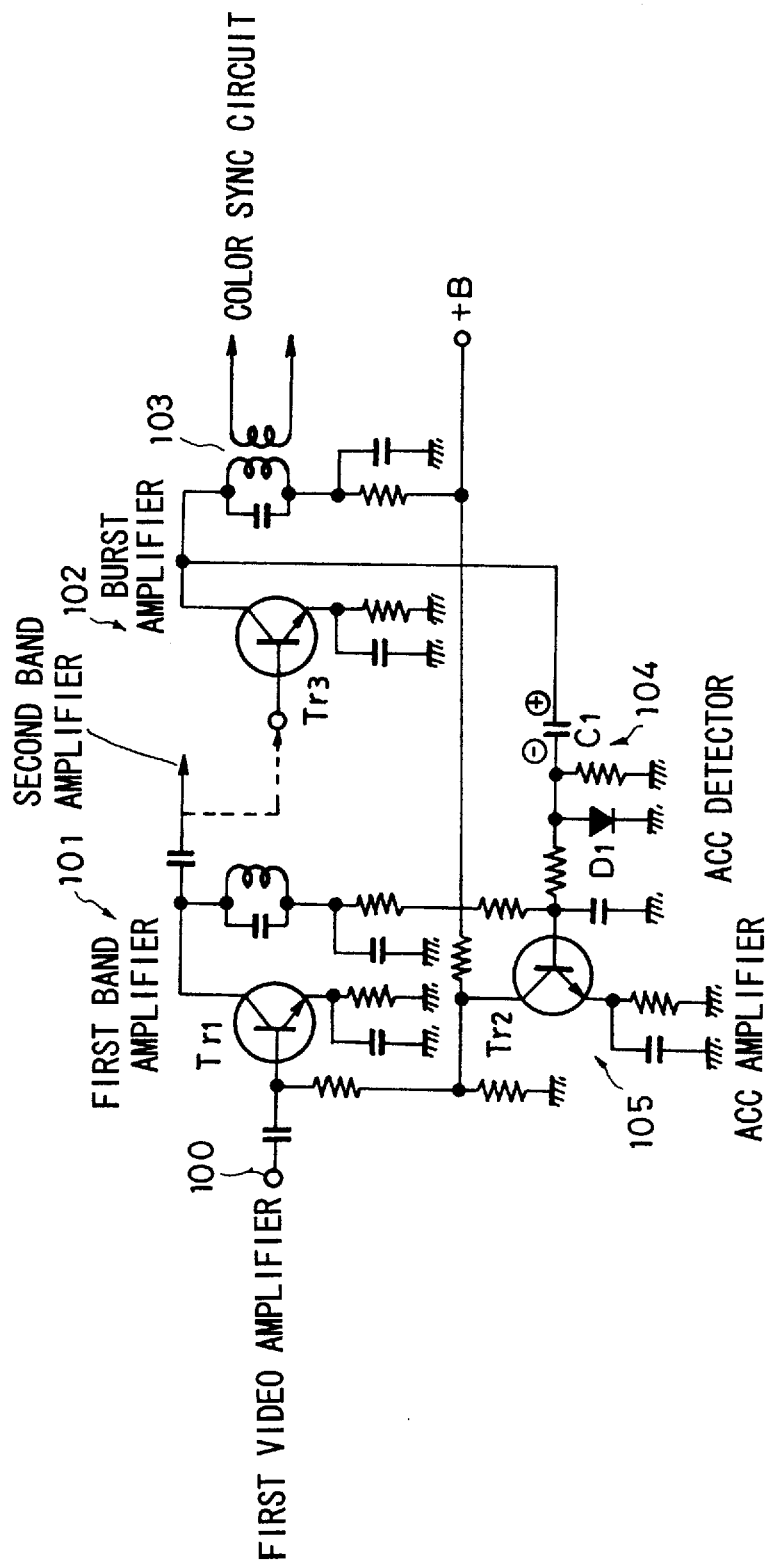
FIG. 2 is a circuit diagram of a typical arrangement of an ACC circuit.
Figure 3:
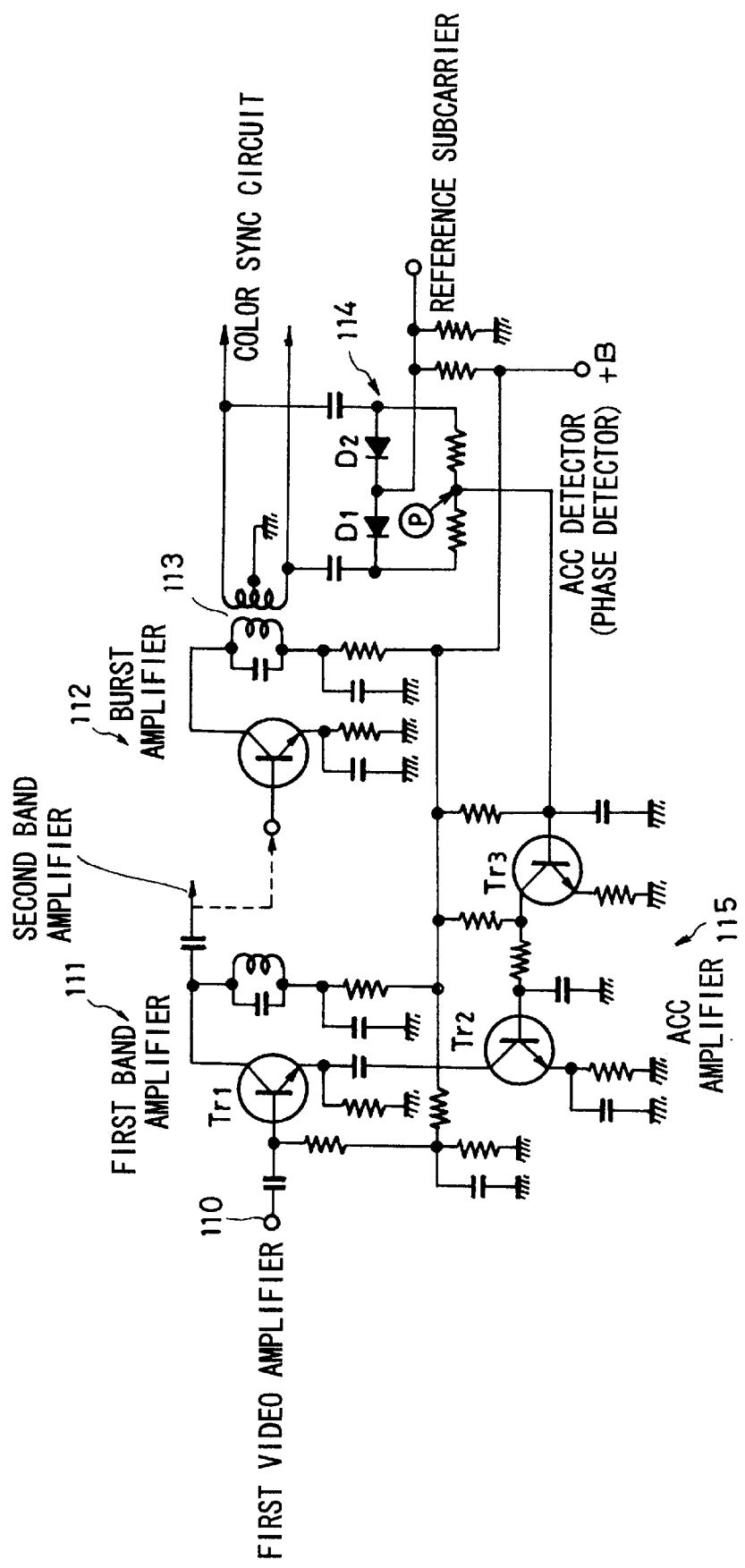
FIG. 3 is a circuit diagram of a typical arrangement of another ACC circuit.

FIGS. 2 and 3 show typical ACC circuits. The ACC circuit of FIG. 2 uses diode detection. A video signal supplied from a first video amplifier to an input terminal 100 is amplified by a first band amplifier circuit 101 and fed to a second band amplifier circuit (not shown). At the same time, color burst signals are extracted by a burst gate (not shown) and supplied to a burst amplifier circuit 102. The color burst signals amplified by the burst amplifier circuit 102 are supplied to both a color sync circuit via a burst transformer 103 and an ACC detector 104. In the ACC detector, the color burst signals are envelope-detected by capacitor C1 and diode D1, and supplied to an ACC amplifier circuit 105, which, in turn, control the bias voltage of the first band amplifier circuit 101. As a result, the gain of the first band amplifier circuit is adjusted in response to changes in the color burst signal level.

The ACC circuit of FIG. 3 uses phase detection. Like the circuit of FIG. 2, a video signal supplied from the first video amplifier to input terminal 110 is amplified by a first band amplifier circuit 111 and supplied to a second band amplifier circuit; while color burst signals are extracted by a burst gate (not shown). The extracted color burst signals are amplified by a burst amplifier circuit 112 and supplied to both a color sync circuit via a burst transformer 113 and an ACC detector circuit 114. The ACC detector circuit includes a phase detector that is supplied with a reference subcarrier from an APC circuit (not shown). The reference subcarrier, which is synchronized with the color burst signals, is supplied to a center point between two diodes D2 and D1 connected in the forward direction across the output of burst transformer 113. In the PAL system employed in Europe, for example, the color burst signals are formed as the vector combination of subcarriers on orthogonal axes U and V; and the burst signal is phase-inverted every line about the V axis. Consequently, the reference subcarrier also is phase inverted every line about the V axis in synchronism with the color burst signal.

Figure 4:
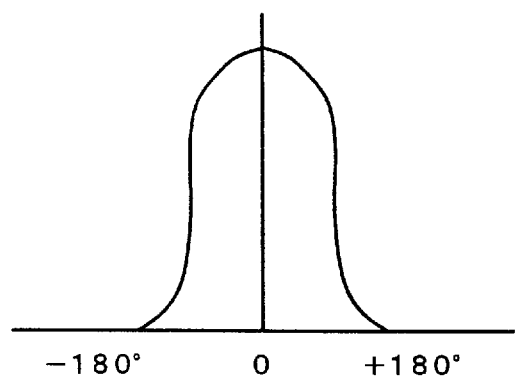
FIG. 4 is a diagram showing the relation between burst phase and detector output for a color burst signal.

The color burst signals supplied from the burst transformer 113 to the phase detector are compared in phase with the reference subcarrier, and an output level based on the detected phase difference is produced at point P in FIG. 3. Accordingly, the relationship between the phase difference between the extracted burst signal and the reference subcarrier on the one hand and the detector output on the other is as shown in FIG. 4, for example. The detector output exhibits a maximum level when the extracted color burst signals and the reference subcarrier coincide in phase (phase difference=0); and the detector output gradually decreases as the phase difference increases so as to exhibit a minimum level when the phase difference is ±180°.

The detector output is supplied to an ACC amplifier circuit 115. In this example, a transistor Tr2 of the ACC amplifier circuit is connected in series to the emitter of the transistor Tr1 of the first band amplifier circuit 111 such that the gain of the first band amplifier circuit 111 is controlled in accordance with changes in the impedance of transistor Tr2 which, in turn, is responsive to the detector output supplied thereto.

In the ACC circuit shown in FIG. 2, using diode detection, the output of the ACC detector circuit 104 depends on the number of cycles and amplitude of the color burst signal and not on its phase. In contrast, in the ACC circuit shown in FIG. 3, using phase detection, the output of the ACC detector circuit 114 depends on the phase of the color burst signal relative to that of the reference subcarrier, and becomes minimum if the phase of the color burst signal is inverted from that of the reference subcarrier. Therefore, the phase detection ACC detector may erroneously determine from an inverted color burst signal, particularly if some but not all of the cycles of the color burst signal are inverted in phase, that the color burst signal level has decreased; and as a result the ACC gain may be increased. Consequently, image disturbances may appear on TV monitors in the form of stripes of color saturation.

Figure 5:
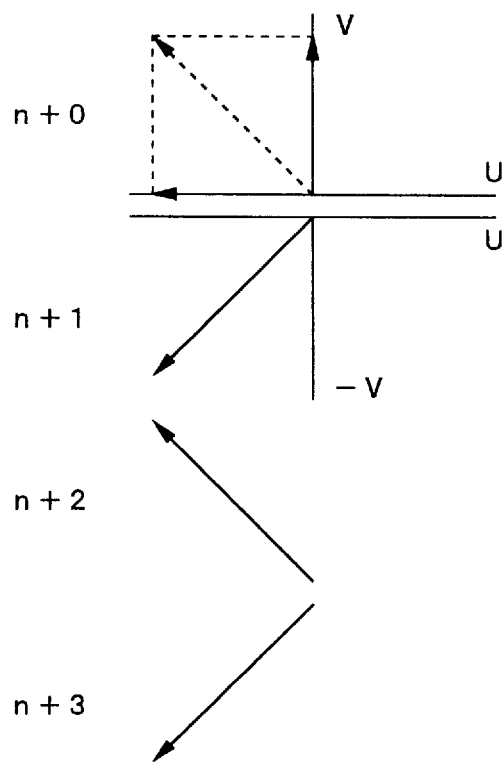
FIG. 5 is a schematic diagram showing phases of color burst signals in lines n to n+3.

In the present invention, the regular color burst signal is replaced in a horizontal line by a copy prohibit signal which is a modified color burst signal produced by controlling the phase of at least one of the orthogonal vectors into which the regular color burst signal is resolved. These orthogonal vectors may be thought of as the usual U and V axes. FIG. 5 shows the U, V phases of the regular color burst signals in lines (n+0) through (n+3) in the PAL or PAL plus system. In these systems, the V component of the color burst signal is phase inverted at every line.

Figure 6:
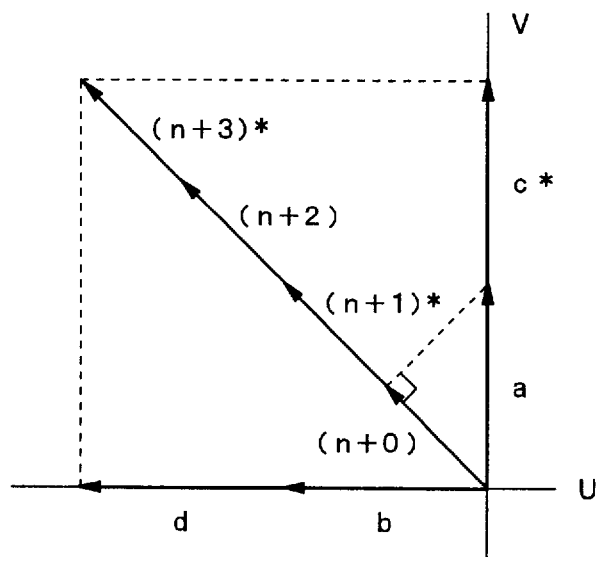
FIG. 6 is a schematic diagram showing the equivalent phase vectors of color burst signals modified by the present invention and phase detected.

In the ACC circuit using phase detection, as shown in FIG. 3, the phase of the reference subcarrier supplied to the center point between the diodes D1 and D2 coincides with the -U axis shown in FIG. 5 and, thus, is not affected by the V axis phase inversion of the color burst signal. As a result, the phase detector output for the color burst signals in lines (n+1) and (n+3) exhibiting -V phase is equivalent to the phase detector output for the color burst signals in lines (n+0) and (n+2) exhibiting +V phase. Therefore, the vectors of the color burst signals for lines (n+1) and (n+3) can be expressed as (n+1)* and (n+3)* by inverting the polarity of the V axis component as shown in FIG. 6. Now, since the phase detector outputs for these four lines are integrated and added, four vectors (n+0), (n+1)*, (n+2) and (n+3)* all in the same direction can be obtained as the ACC detector outputs.

On the other hand, the sum of the detector outputs consisting of these vectors (n+0), (n+1)*, (n+2) and (n+3)* for lines (n+0), (n+1), (n+2) and (n+3) can be resolved into vector (a+c*) and vector (b+d) shown in FIG. 6 on the U and V axes, respectively. Therefore, vectors (n+0), (n+1)*, (n+2) and (n+3)* are related to vectors a, b, c* and d; and vector a may be thought of as equivalent to vector (n+0), vector b may be thought of as equivalent to vector (n+1)*, vector c* may be thought of as equivalent to vector (n+2), and vector d may be thought of as equivalent to vector (n+3)*. This is shown more particularly in FIG. 7 wherein vectors a, b, and d have a phase difference from the regular color burst signals that is as small as 45°, whereas vector c has a phase difference from the regular color burst signal in line (n+2) of 135°. In this embodiment, the regular color burst signals are replaced by vectors a, b, c and d, with vector c having a large phase difference from the regular burst signal. The replacement vectors constitute the copy prohibit signals used to prohibit copying by VCRs.

Figure 7:
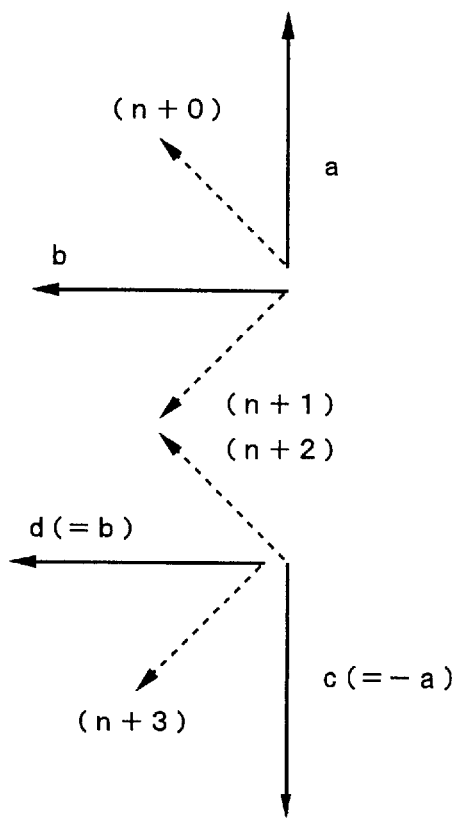
FIG. 7 is a schematic diagram showing phase control of color burst signals according to an embodiment of the present invention.

The regular color burst signal is phase controlled consistent with the phase diagrams of FIGS. 6 and 7 to form the modified color burst signal used in this embodiment. Phase control preferably is effected on the orthogonal axes, such as the U and V axes, although it is contemplated that a desired phase difference from the normal (or regular) color burst signal can be produced directly as the modified burst signal.

As explained above, the composite vector formed by summing vectors (n+0) through (n+3) and the composite vector formed by summing vectors a through d are equal. Therefore, in the ACC circuit using phase detection, if the detector outputs are integrated over these four lines, no difference appears in the output resulting from the color burst signal composed of vectors (n+0) through (n+3) and the output resulting from the color burst signal composed of vectors a through d. That is, the color burst signal whose phase is formed by vectors a through d produces no disturbance to those TV monitors which employ long time constant APC circuits using phase detection, but vector c of this burst signal causes image disturbances in VCRs employing short time constant APC circuits, thereby making the copy prohibit function effective.

In the above explanation, the color burst signal whose phase is formed of vector a is referred to as color burst signal a, and the color burst signal whose phase is formed of vector b is referred to as color burst signal b. The color burst signal whose phase is formed of vector c is referred to as color burst signal (-a) because vector c corresponds to the inversion of vector a. Similarly, the color burst signal whose phase is formed of vector d is referred to as color burst signal b because vector d is equal to vector b.

Figure 8A:
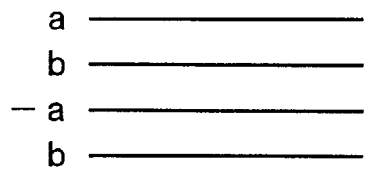
FIGS. 8A to 8C are schematic diagrams showing examples of the distribution of modified color burst signals according to an embodiment of the invention.
Figure 8B:
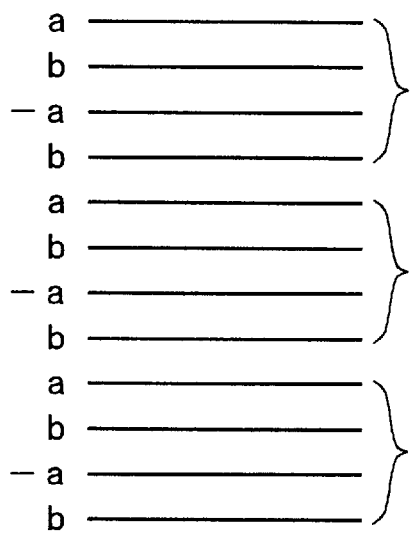
Figure 8C:
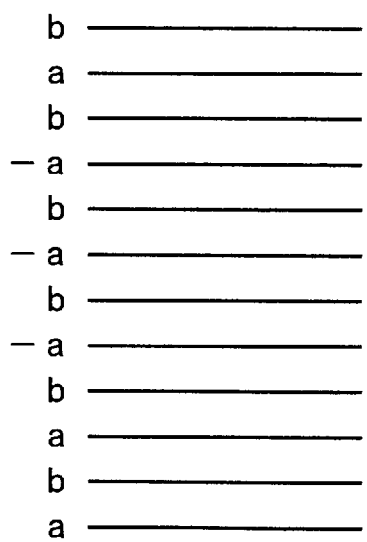

In this manner, by appropriately distributing phase-controlled or amplitude-controlled color burst signals in selected lines within a field, modified color induce image can induce image disturbances in copied video signals. FIGS. 8A through 8C show examples of such distributions. FIG. 8A shows a distribution equivalent to FIG. 7, which is the basic arrangement of the modified color burst signals in accordance with the presently described embodiment. In the basic arrangement, color burst signal a, color burst signal b, color burst signal (-a) and color burst signal b are disposed in sequence in continuous lines (n+0) to (n+3) to form one block of color burst signals. The integrated phase detector output is seen to be equal to that for a color burst signal having the regular phase.

FIG. 8B shows an example in which the four-line arrangement of FIG. 8A is repeated three times and the resultant 12 lines form a block of modified color burst signals. In this arrangement, the copy prohibit function is attributed primarily to the color burst signal (-a) disposed every four lines in a block of modified color burst signals. Here, since the copy prohibit effect is obtained primarily from the color burst signal (-a) that appears every four lines, a strong copy prohibit effect is not expected. FIG. 8C shows an example in which three lines of the color burst signal (-a) are distributed in 12 lines but appear to be concentrated to strengthen the copy prohibit function. In this example, the color burst signal (-a) appears every two lines, and the color burst signal (b) appears every two lines (i.e. they alternate). Therefore, the integrated phase detector output is here again equal to that of the color burst signal having the regular phase.

Figure 9:
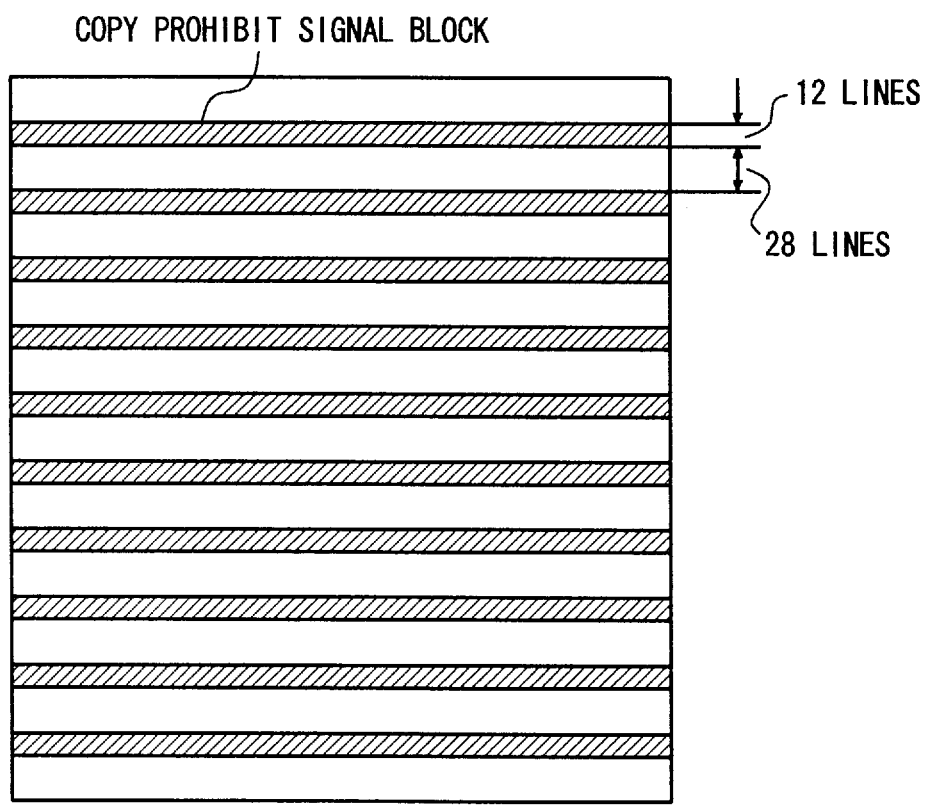
FIG. 9 is a schematic diagram showing an example of the distribution of modified color burst signals in an image plane.

FIG. 9 shows an example of the appearance of an image as a result of the aforedescribed copy prohibit signal. In this example, the block of modified color burst signals having the 12-line arrangement shown in FIG. 8C is spaced apart by an interval of 28 lines. This of course, simply is one example, and other arrangements may be employed. For example, two continuous blocks of modified color burst signals, each block being comprised of 12 lines, may be used. As another example, the spacing between every two blocks of modified color burst signals may be changed. Also, blocks of modified color burst signals may be distributed over the entire image. Although blocks of modified color burst signals typically are distributed in continuous fields, they may be distributed in discontinuous fields, for example, every two fields. Moreover, the positions of these copy prohibit blocks of modified burst signals may change from field to field.

Figure 10:
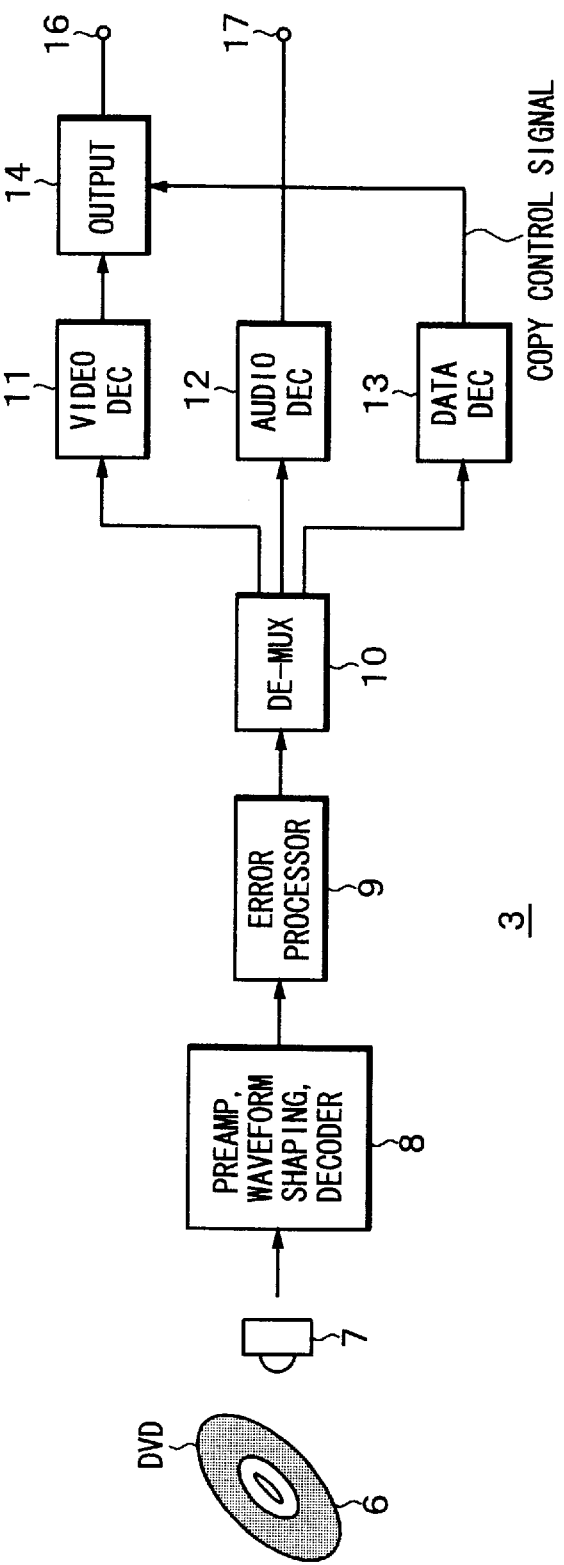
FIG. 10 is a block diagram of a portion of a DVD player.

FIG. 10 shows an example in which the present invention is used in a system such as that shown in FIG. 1B configured to produce an analog video signal from the digital signal reproduced by a DVD player 3. A digital signal that had been compressed by MPEG encoding techniques, for example, is read out from disc 6 by an optical pickup 7 and supplied to an error processing circuit 9 through a preamplifier/waveform-shaper/decoder 8. The error processing circuit decodes the error correction code used to encode the digital signal to correct errors that may be present therein; and the output of error processing circuit 9 is supplied to a demultiplexer 10 which separates the video data, the audio data and the control digital data from the reproduced signal.

The video data is supplied to a video decoder 11 which decodes the compressed video data and converts the decoded video information into an analog video signal which is supplied to an output circuit 14. The output circuit 14 uses the present invention to prohibit copying of the thus recovered analog video signal in a manner explained below in greater detail. Accordingly, output terminal 16 is supplied with an analog video signal to which modified color burst signals have been selectively added. The audio data from demultiplexer 10 is decoded and converted into an analog audio signal by an audio decoder 12, and the analog audio signal is coupled to output terminal 17. A digital data decoder 13 separates and decodes the control digital data that had been recorded on disc 6. The control digital data contains copy generation management system data (CGMS), and a copy control signal is selectively produced as a function of CGMS. The copy control signal is coupled to output circuit 14 to selectively control the addition of modified color burst signals to the recovered analog video signal.

Figure 11:
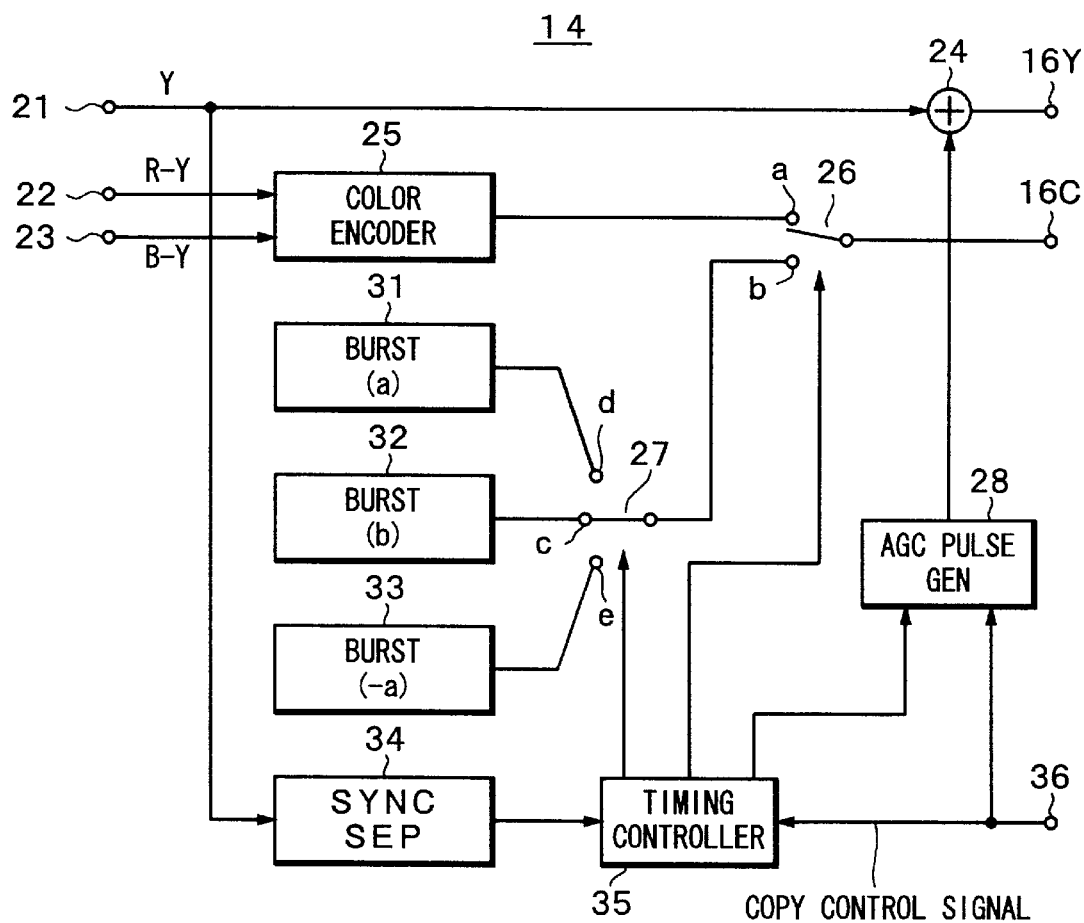
FIG. 11 is a block diagram of a copy protection arrangement in which the present invention finds ready application.

FIG. 11 shows an example of output circuit 14 that can produce and insert modified color burst signals into the recovered analog video signal, as explained above. In this example, the AGC pulse system, represented by AGC pulse generator 28, is used in combination with the modified color burst signals a, b, c and d of the present invention in order to further increase the copy prohibit effect. The reproduced video signal from video decoder 11 is supplied to output circuit 14 as an analog component signal, for example. That is, input terminals 21, 22 and 23 receive the luminance signal (containing a sync signal) Y and chrominance signals R-Y and B-Y. The luminance signal Y is supplied to an output terminal 16Y through an adder 24.

The chrominance signals R-Y and B-Y are supplied to a color encoder 25 which, as is conventional, produces a carrier color signal (containing a color burst signal) with the carrier being modulated by orthogonal two-phase modulation. The carrier color signal from color encoder 25 is supplied to an input terminal a of a switcher 26 which is used to substitute a modified color burst signal for the regular color burst signal, thereby inserting a copy prohibit signal into the video signal. The output of switcher 26 is coupled to an output terminal 16C.

Supplied to an input terminal d of another switcher 27 is the color burst signal a generated by a signal generator 31. An input terminal c of the switcher 27 is supplied with the color burst signal b generated by a signal generator 32; and an input terminal e of the switcher is supplied with the color burst signal (-a) generated by a signal generator 33. The output of switcher 27 is coupled to an input terminal b of switcher 26, the state of which is determined by the output from a timing controller 35. That is, when the copy control signal recovered by digital data decoder 13 indicates that a copy of the recovered video signal may be made, input terminal a is selected, and the modified color burst signal is not substituted for the regular color burst signal. On the other hand, when the copy control signal indicates that a copy of the recovered video signal cannot be made, input terminal b is selected and the modified color burst signal is substituted. Therefore, when the video signal produced at output terminals 16Y and 16C is recorded by an analog VCR, satisfactory images are not reproduced, thus effecting the copy prohibit function. The control mode of switcher 26 changes between input terminals a and b depending on whether copying is permitted; and timing controller 35 is supplied with a sync signal separated from the luminance signal Y in a sync separator circuit 34 and with the copy control signal supplied to input terminal 36 by digital data decoder 13.

Adder 24 receives an AGC pulse from AGC pulse generator 28 and adds this AGC pulse to the luminance signal Y. The AGC pulse generator 28 selectively generates pseudo-sync (AGC) pulses of the type shown in FIGS. 21A and 21B if copying is not permitted. The generation of these pulses is controlled by the copy control signal supplied from data decoder 13 (FIG. 10) to input terminal 36. When the AGC pulses are used, an irregular video signal is recorded due to the AGC operation during recording.

Although not shown, the color burst signal a and (-a) exhibit the same amplitude but inverted phase, and the color burst signal b exhibits the same thereto amplitude as color burst signal a but differs in phase by 90° relative thereto. Therefore, the embodiment of output circuit 14 may be changed so as to eliminate signal generators 32 and 33; and the color burst signal (-a) still can be obtained simply by inverting the color burst signal a from signal generator 31 by using an inverter, for 5 example, and the color burst signal b still can be obtained by shifting the phase of the color burst signal a by a 90° phase shifter.

Figure 12:
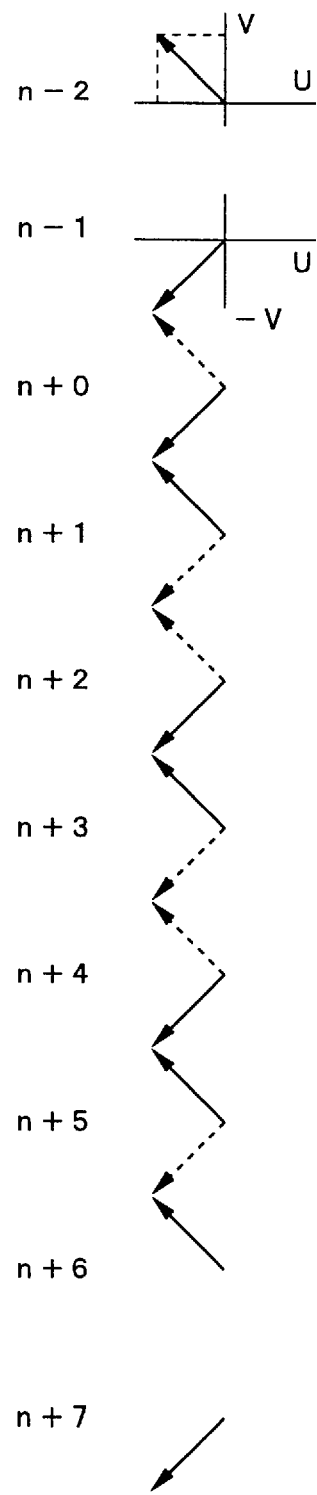
FIG. 12 is a schematic diagram showing an example of color burst signal phase control according to another embodiment of the invention.
Figures 13A, 13B:
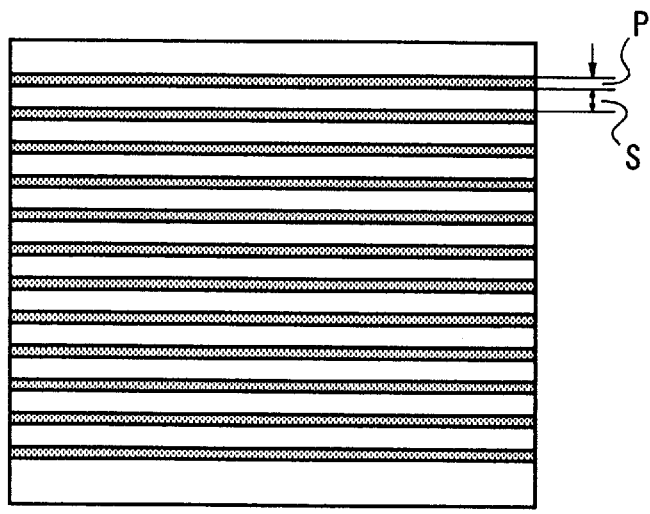
FIGS. 13A and 13B are schematic diagrams showing an arrangement of a displayed image using the modified color burst signals according to the embodiment of FIG. 12.

Another embodiment of the present invention is illustrated in FIG. 12 which shows an example of phase control of the color burst signal wherein the modified color burst signal is produced by shifting the phase of the regular color burst signal by 90°. Moreover, this 90° phase shift is provided in six continuous lines, from lines (n+0) through (n+5) as shown in FIG. 12, in order to enhance the copy prohibit function. (Solid lines in FIG. 12 indicate the actual phase of the color burst signal and broken lines indicate the non-shifted phase of the regular color burst signal which is modified by the present invention.) By grouping these six lines as one block of modified color burst signals and by distributing the blocks in the same manner as the embodiment described above in FIGS. 8 and 9, an improved copy prohibit operation is obtained. When two to six continuous lines of the modified color burst signals are distributed throughout an image with intervals between these lines of modified color burst signals of 20 to 50 lines of regular color burst signals, image disturbances can be made effectively to ensure the copy prohibit function. FIG. 13A schematically shows the image containing modified (90° phase-shifted) color burst signals, wherein region P represents the distribution of modified color burst signals over a plurality of lines, e.g. four lines, and region S represents the distribution of regular color burst signals over a plurality of lines, e.g. 30 lines, with regions P and S being alternately arranged in each field.

FIG. 13B shows an example of different distributions of lines of modified color burst signals in region P and lines of regular color burst signals in region S. Signal-1 through Signal-3 are examples in which the modified color burst signals are distributed in units of 40 lines (6 lines of modified color burst signals being separated by 34 lines of regular color burst signals, or 4 lines of modified color burst signals being separated by 36 lines of regular color burst signals, or 2 lines of modified color burst signals being separated by 38 lines of regular color burst signals), and Signal-4 through Signal-6 are examples in which the modified color burst signals are distributed in units of 34 lines. Depending on the number of lines of modified color burst signals and the number of lines of regular color burst signals in the distribution pattern, the effect of disturbances in TV receivers or video tape recorders varies. More specifically, the more lines of modified color burst signals in region P, the larger the disturbance in video tape recorders. However, there is also the possibility that this will produce an undesired disturbance in TV receivers that are supplied with an original copy-protected video signal (i.e., one that has not been copied) which contains the copy prohibit signals. On the other hand, when a smaller number of lines of modified color burst signals are provided in region P, disturbances to TV receivers are less likely to occur, but also the copy prohibit effect on video tape recorders is reduced. Therefore, an appropriate balance between the number of lines of modified color burst signals in region P and the number of lines of regular color burst signals in region S should be chosen on a case by case basis. When the number of lines containing regular color burst signals is five to ten times the number of lines containing modified color burst signals, copy prohibition can be more effective.

It also is contemplated that the relationship between the number of lines in region P and the number of lines in region S be varied, depending upon the scenes in the video program. For example, a combination of lines in regions P and S causing a larger image disturbance may be chosen for scenes with movements because movement tends to conceal the image disturbance; and a combination of lines in regions P and S causing less image disturbance may be chosen for scenes with less movements because image disturbance is more noticeable when there is little movement. In this manner, image disturbances caused by region P can be made more conspicuous for video tape recorders but less noticeable in TV receivers. The lines in region P and region S shown as Signal-1 through Signal-6 are only examples, and other combinations may be adopted.

Since this embodiment of the present invention shifts the phase of the regular color burst signal by only 90°, a block of modified color burst signals can be produced by phase shifting only the first line in a sequence of regular burst signals. For example, a simple one line delay circuit may be used to shift the phase in the sequence of regular color burst signals; and the block of modified color burst signals will be selected by a switcher. Therefore, the process for producing copy prohibit signals is easy, and the circuit arrangement therefor is simple.

Figure 14:
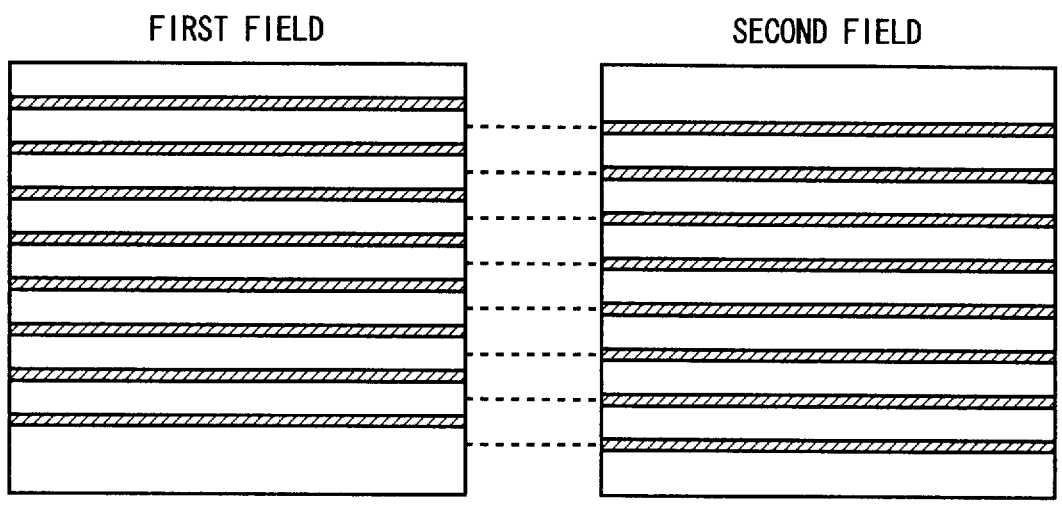
FIG. 14 is a schematic diagram showing another arrangement of a displayed image using the modified color burst signals according to the embodiment of FIG. 12.
Figure 15:
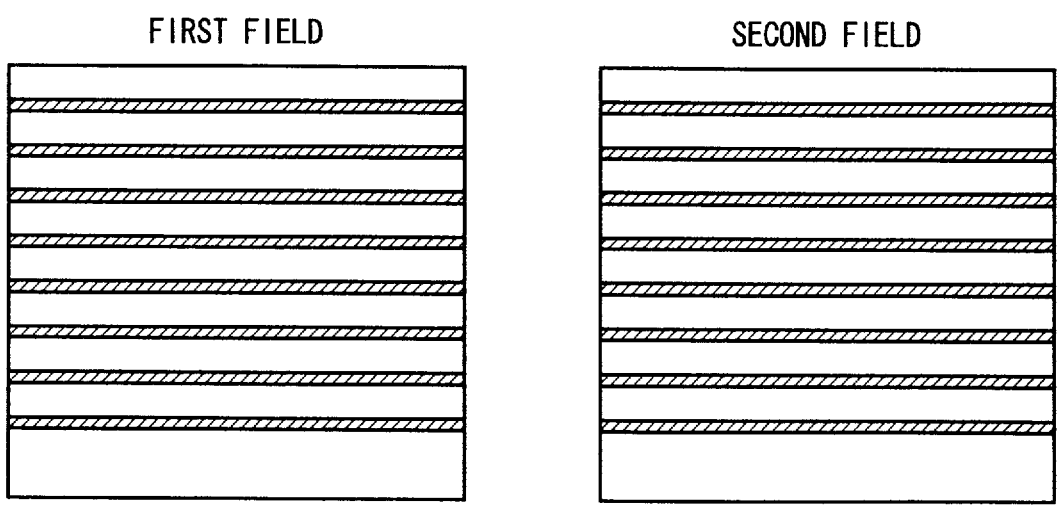
FIG. 15 is a schematic diagram showing a further arrangement of a displayed image using the modified color burst signals according to the embodiment of FIG. 12.

FIGS. 14 and 15 show examples of the distribution of regions P and regions S in different fields. In the example of FIG. 14, the positions of regions P in the first field are offset from the positions of regions P in the second field. By locating regions P in different positions in the fields, flicker can be produced while the images are displayed. In this example, offsetting is obtained by positioning each region P in the second field at the center of each region S in the first field. As a result, the displayed image appears to include a uniform distribution of regions P, and therefore looks as if it includes modified color burst signals over twice the number of lines in each field. Thus, image disturbance is enhanced.

When regions P are distributed as shown in FIG. 14, image disturbances may occur in some TV receivers, such as flicker or instability due to the asymmetry of the respective fields. These TV disturbances can be prevented by locating regions P in the same position in all fields, as shown in FIG. 15. Although the arrangement of FIG. 15 diminishes the image disturbances induced in images copied by video tape recorders as compared with the arrangement of FIG. 14, the FIG. 15 arrangement alleviates image disturbances in TV receivers when an original video signal containing copy prohibit signals (as reproduced by the apparatus of FIG. 10) is supplied to the TV receiver for display.

It will be appreciated that although the distribution of modified color burst signals in regions P has been explained with reference to the embodiment shown in FIG. 12, the distribution of regions P and S is equally applicable to the first described embodiment shown in FIGS. 6–8.

Output circuit 14, explained with reference to FIG. 11 in relation to the burst phase inversion embodiment, can be adapted for use in the 90° phase shift embodiment of FIG. 12. Here, only two of the signal generators 31, 32 and 33 are needed. Alternatively, the modified (i.e. 90° phase-shifted) color burst signal may be produced by generating the color burst signal having regular phase and by delaying the regular phase burst signal by one-line delay, for example, as mentioned above.

Figure 16:
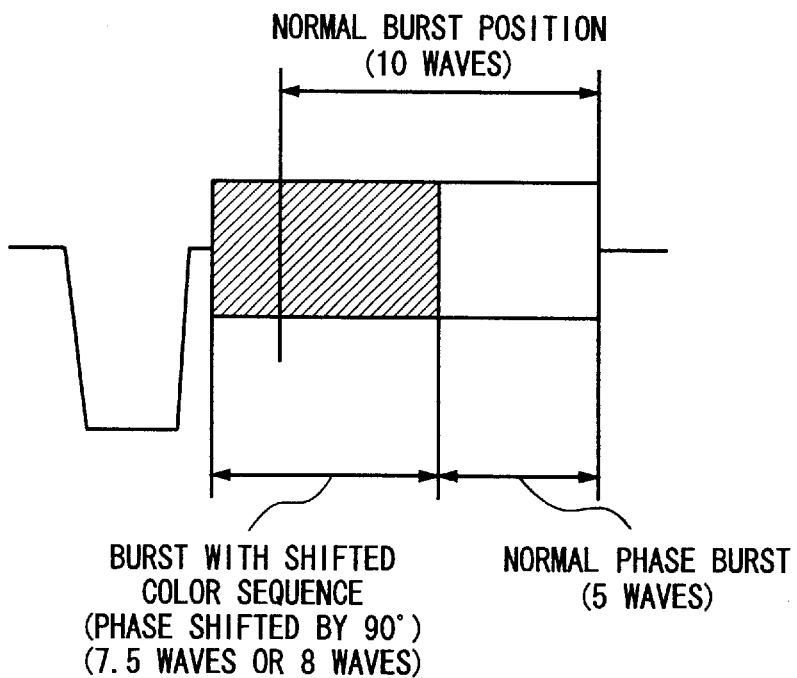
FIG. 16 is a schematic diagram showing an example of the waveform of a color burst signal modified according to the invention.
Figure 22:
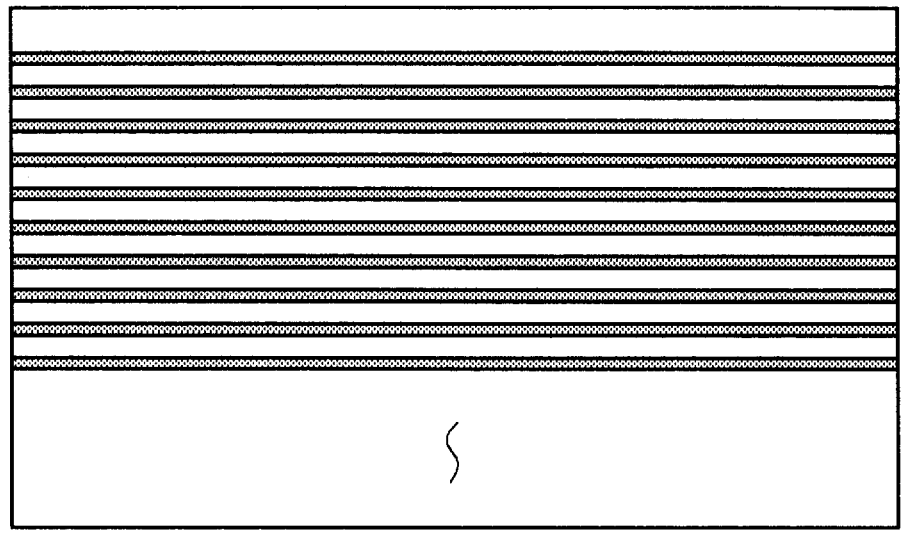
FIG. 22 is a schematic diagram of a color stripe display.
Figure 23A:
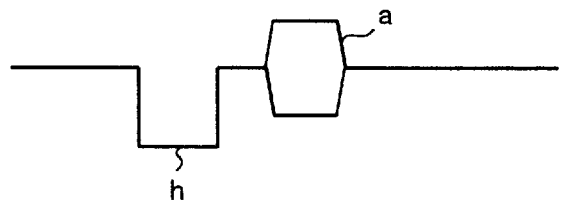
FIG. 23A and 23B are waveform diagrams showing an original color burst signal and a recorded/reproduced color burst signal.
Figure 23B:
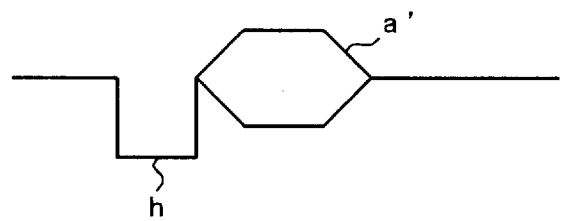

In the foregoing embodiments, the entire burst period of regular color burst signals is replaced by modified color burst signals. For example, if the burst period contains 10 cycles or the regular color burst signal, all 10 cycles are replace by 10 cycles of the phase-inverted or 90° phase-shifted modified color burst signal. But, this invention is not limited solely to such full period substitutions. For example, as shown in FIG. 16, three cycles or 2.5 cycles may be added to the 10-cycle period of regular color burst signals, and the first 8 cycles or the first 7.5 cycles may be replaced by 8 or 7.5 cycles of modified color burst signals. The remaining 5 cycles in the burst period maintain the same phase and amplitude as the regular color burst signals. That is, these remaining 5 cycles may be thought of as 5 cycles of the regular color burst signal.

It may also be possible to fully invert the phase of the color burst signal, as shown in FIG. 17, which differs from the modified color burst signal shown in FIG. 7 or the modified color burst signal shown in FIG. 12. This possibility, however, is not recommended because the phase-inverted color burst signal contains a component in the positive direction of the U axis, which is not contained in the regular color burst signal, and is likely to cause a disturbance in the ACC circuit of the TV monitor. Preferably, when the modified burst signal in accordance with the present invention is produced, it is best to avoid shifting the phase of the burst signal by an amount that produces a positive-direction component along the U axis.

It will be appreciated that the present invention is applicable to adding modified color burst signals to composite signals containing superposed luminance and carrier color signals, as well as to component color video signals as depicted in FIG. 11.

The copy control signals used in FIGS. 10 and 11 may be generated on the basis of pre-recorded CGMS data added to the digital video signals recorded on disc 6, for example. FIG. 18A shows an example of 2-bit CGMS data as follows:

00: approve copy
01: undefined or spare
10: approve 1st generation copy
11: prohibit copy If CGMS data is intended to control only digital copying, then a flag or flags which determine whether an analog copy can be made, namely, trigger bits instructing the generation of an analog copy prohibit signal to be inserted into the analog video signal, may be formed separately from the CGMS data. FIG. 18B shows such an example in which trigger bits "00" mean that analog copy prohibit signals are not to be generated and trigger bits "01" mean that only the AGC signal used in the AGC pulse system should be generated as the analog copy prohibit signals. Trigger bits "11" mean that the AGC signal and the modified color burst signal using phase inversion in accordance with the present invention (FIG. 7) should be generated. Although trigger bits "10" may be undefined (or held as spare bits), these bits "10" may be used to mean that the modified color burst signal using 90° phase shifting in accordance with FIG. 12 of the present invention, together with the AGC signal should be generated. It is appreciated that a total of four bits, containing CGMS and trigger bits, may be used as copy prohibit information to control the making of an analog copy.

Although FIG. 18 has been described in the context of controlling the generation of copy prohibit signals according to the AGC pulse system and controlling the generation of copy prohibit signals in the form of modified color burst signals using the present invention, this invention is not restricted solely thereto. That is, by supplying corresponding trigger bits independently of the data decoder 13 shown in FIG. 10, the copy control signal can be generated satisfactorily.

Various techniques may be used for recording CGMS on a recording medium. Digital VCRs employ data arrangements as shown in FIGS. 19 and 20. FIG. 19 shows the construction of a VAUX (video auxiliary data) pack, which is a pack having the pack header of (01100001). Recorded in this pack is CGMS data as the most-significant two bits of byte PC1. The definition of this CGMS data is the same as that shown in FIG. 18A, for example. The copy source bits in PC1 are defined as follows:

00: The video signal is a copy from analog source
01: The video signal is a copy from digital source
10: spare
11: no information.

The copy generation bits in PC1 are defined as:

00: The video signal is a first generation copy
01: The video signal is a second generation copy
10: The video signal is a third generation copy
11: The video signal is a fourth generation copy.

FIG. 20 shows the construction of an audio auxiliary data (AAUX data) pack relating to the audio signal recorded on a digital VCR. The header of this pack is (01010001). Recorded in the PC1 byte of this pack is CGMS data in the same form as in the VAUX pack. When the CGMS data included in the input video signal to be recorded means that only one generation may be copied, the CGMS data on the tape is rewritten to "prohibit copy" when that input video signal is recorded.

When the digital video signal is recorded on a DVD disc, the data is recorded in segments such as sectors, and a sync signal and a header are added to the head of each segment. Information for copy control similar to that discussed above is recorded in the header.

As explained above, the copy prohibit signal according to the present invention is formed of phase-controlled color burst signals. Phase control may be achieved by controlling the phase of one of the vectors into which the phase of the regular color burst signal is resolved. Therefore, while maintaining the copy prohibit effect on VCRs, image disturbance on TV monitors which display the original (non-copied) copy prohibit signal can be reduced significantly.

The color burst signals for prohibiting copying according to the present invention are equivalent to regular color burst signals in terms of vectors. Therefore, in the ACC circuit of a TV monitor, the copy prohibit color burst signals are acted upon as if they are regular color burst signals, and no adjustments to compensate for ACC-derived disturbances to TV monitors are required. Therefore, even when several TV monitors having different ACC circuits are connected or if ACC circuits for the main screen and sub-screen of a single TV monitor (e.g., picture-in-picture) have different characteristics, residual error is avoided and re-adjustment is not necessary.

Moreover, the modified color burst signals which constitute the copy prohibit signals according to the present invention may replace the entire waveform of the regular color burst signal or only a portion (i.e., less than all of the cycles) of that waveform.

While the present invention has been particularly shown and described with reference to certain preferred embodiments it will be appreciated that various changes and modifications may be made without departing from the spirit and scope of the invention. It is intended, therefore, that the claims be interpreted to include the embodiments that have been disclosed, the changes and alternatives that have been described, and all equivalents thereto.

What is claimed is:

1. Apparatus for prohibiting copying of an analog video signal of the type having plural lines of video signals and regular burst signals included in said lines, comprising:

modified burst signal generating means for generating modified burst signals whose phase is controlled in plural continuous lines such that an average value of phase vectors derived from said controlled phase, over said plural continuous lines, is substantially equal to the average value of the phase vectors of said regular burst signals over said plural continuous lines; and replacement means for replacing said regular burst signals in said plural continuous lines with said modified burst signals.

2. The apparatus of claim 1 wherein said modified burst signal generating means includes phase control means for controlling the phase of at least one orthogonal component into which the phase of said regular color burst signal is resolved, thereby generating said modified first signal.

3. The apparatus of claim 2 wherein the phase of said one orthogonal component is controlled to produce in selected lines a modified burst signal whose phase differs from the phase of said regular burst signals by an amount that is greater than the phase difference of said modified burst signals in other lines; and wherein said replacement means is operative to replace said regular burst signals with the modified burst signal of greater phase difference systematically over said plural continuous lines.

4. The apparatus of claim 3 wherein said phase difference of said modified burst signals in said other lines from the phase of said regular burst signals is minimized.

5. The apparatus of claim 2 wherein the phase vector of said regular burst signal is resolvable into U and V orthogonal components and said phase control means is operable to produce a phase inversion of said V component in selected lines.

6. The apparatus of claim 5 wherein said continuous lines are lines (n+0), n+1), (n+2) and (n+3), where n is an integer, and the phase inversion of said V component is produced in line (n+2).

7. The apparatus of claim 1 wherein said replacement means is operable to replace said regular burst signals with said modified burst signals in blocks of continuous lines, with successive blocks being separated by several lines containing said regular burst signals.

8. The apparatus of claim 7 wherein said blocks of continuous lines constitute a first region and said several lines constitute a second region; and wherein said first region is located in one filed of a frame at different positions in said one field than the locations of said first region in the other field of said frame.

9. The apparatus of claim 7 wherein said blocks of continuous lines constitute a first region and said several lines constitute a second region; and wherein said first region is located in one field of a frame at the same position in said one field as the locations of said first region in the other field of said frame.

10. The apparatus of claim 1 wherein said replacement means in operative to replace all cycles of said regular burst signal in said plural continuous lines with said modified burst signals.

11. The apparatus of claim 1 wherein said replacement means is operative to replace only some of the cycles of said regular burst signal in said plural continuous lines with said modified burst signal to produce burst intervals containing both said regular and said modified burst signal cycles.

12. The apparatus of claim 1 wherein said modified burst signal generating means is operative to produce modified burst signals having a line-to-line phase sequence in said continuous lines that differ from the line-to-line phase sequence of said regular burst signal in said continuous lines.

13. The apparatus of claim 12 wherein the phase of said modified burst signal in said line-to-line phase sequence differs from the phase of said regular burst signal in said line-to-line phase sequence by 90°.

14. A recording medium on which digital video signals are stored for playback by digital video processing means from which an analog video signal is derived, said digital video signals including copy prohibit data from which said analog video signal is modified so as to be viewable on a TV monitor but not copyable on an analog video recorder, said copy prohibit data causing replacement in plural continuous lines of said analog video signal of regular burst signals in said continuous lines with modified burst signals whose phase is changed from the phase of said regular burst signals such that an average value of phase vectors of said modified burst signals is substantially equal to an average value of the phase vectors of said regular burst signals over said plural continuous lines.

15. The recording medium of claim 14 wherein said continuous lines are lines (n+0), (n+1), (n+2) and (n+3), where n is an integer; wherein, the phase vectors of said regular and modified burst signals are resolvable into orthogonal U and V components; and wherein the phase of the modified burst signal is changed by phase-inverting the V component in line (n+2).

16. The recording medium of claim 14 wherein said copy prohibit data causes said regular burst signals to be replaced by said modified burst signals in blocks of continuous lines, with successive blocks being separated by several lines containing said regular burst signals.

17. The recording medium of claim 16, wherein said blocks of continuous lines constitute a first region and said several lines constitute a second region; and wherein said first region is located in one field of a frame at different positions in said one field than the locations of said first region in the other field of said frame.

18. The recording medium of claim 6, wherein said blocks of continuous lines constitute a first region and said several lines constitute a second region; and wherein said first region is located in one field of a frame at the same position in said one field as the locations of said first region in the other field of said frame.

19. The recording medium of claim 14 wherein said copy prohibit data causes all cycles of said regular burst signals in said plural continuous lines to be replaced by said modified burst signals.

20. The recording medium of claim 14, wherein said copy prohibit data causes only some of the cycles of said regular burst signals in said plural continuous lines to be replaced with said modified burst signals to produce burst intervals containing both said regular and said modified burst signal cycles.

21. The recording medium of claim 14 wherein said copy prohibit data causes said modified burst signals to have a line-to-line phase sequence in said continuous lines that differs from the line-to-line phase sequence of said regular burst signals in said continuous lines.

22. The recording medium of claim 21 wherein the phase of said modified burst signal in said line-to-line phase sequence differs from the phase of said regular burst signal in said line-to-line phase sequence by 90°.

23. A method of prohibiting copying of an analog video signal of the type having plural lines of video signals and regular burst signals included in said lines, comprising the steps of:

generating modified burst signals whose phase is controlled in plural continuous lines such that an average value of phase vectors derived from said controlled phase, over said plural continuous lines, is substantially equal to the average value of the phase vectors of said regular burst signals over said plural continuous lines; and replacing said regular burst signals in said plural continuous lines with said modified burst signals.

24. The method of claim 23 wherein said modified burst signal is generated by controlling the phase of at least one orthogonal component into which the phase of said regular color burst signal is resolved.

25. The method of claim 24 wherein the phase of said one orthogonal component is controlled to produce in selected lines a modified burst signal whose phase differs from the phase of said regular burst signals by an amount that is greater than the phase difference of said modified burst signals in other lines; and wherein said regular burst signals are replaced with the modified burst signal of greater phase difference systematically over said plural continuous lines.

26. The method of claim 25 wherein said phase difference of said modified burst signals in said other lines from the phase of said regular burst signals is minimized.

27. The method of claim 24 wherein the phase vector of said regular burst signal is resolvable into U and V orthogonal components and said phase of at least one orthogonal component is controlled by producing a phase inversion of said V component in selected lines.

28. The method of claim 27 wherein said continuous lines are lines (n+0), (n+1), (n+2) and (n+3), where n is an integer, and the phase inversion of said V component is produced in line (n+2).

29. The method of claim 23 wherein said regular burst signals are replaced with said modified burst signals in blocks of continuous lines, with successive blocks being separated by several lines containing said regular burst signals.

30. The method of claim 29 wherein said blocks of continuous lines constitute a first region and said several lines constitute a second region; and wherein said first region is located in one field of a frame at different positions in said one field than the locations of said first region in the other field of said frame.

31. The method of claim 29 wherein said blocks of continuous lines constitute a first region and said several lines constitute a second region; and wherein said first region is located in one field of a frame at the same position in said one field as the locations of said first region in the other field of said frame.

32. The method of claim 23 wherein all cycles of said regular burst signal in said plural continuous lines are replaced with said modified burst signals.

33. The method of claim 23 wherein only some of the cycles of said regular burst signal in said plural continuous lines are replaced with said modified burst signal to produce burst intervals containing both said regular and said modified burst signal cycles.

34. The method of claim 23 wherein said modified burst signals have a line-to-line phase sequence in said continuous lines that differ from the line-to-line phase sequence of said regular burst signal in said continuous lines.

35. The method of claim 34 wherein the phase of said modified burst signal in said line-to-line phase sequence differs from the phase of said regular burst signal in said line-to-line phase sequence by 90°.

* * * * *